July 21, 1942.  R. C. PIERCE  2,290,380
MACHINE FOR HOSE CONSTRUCTION
Filed Aug. 21, 1939  2 Sheets-Sheet 1
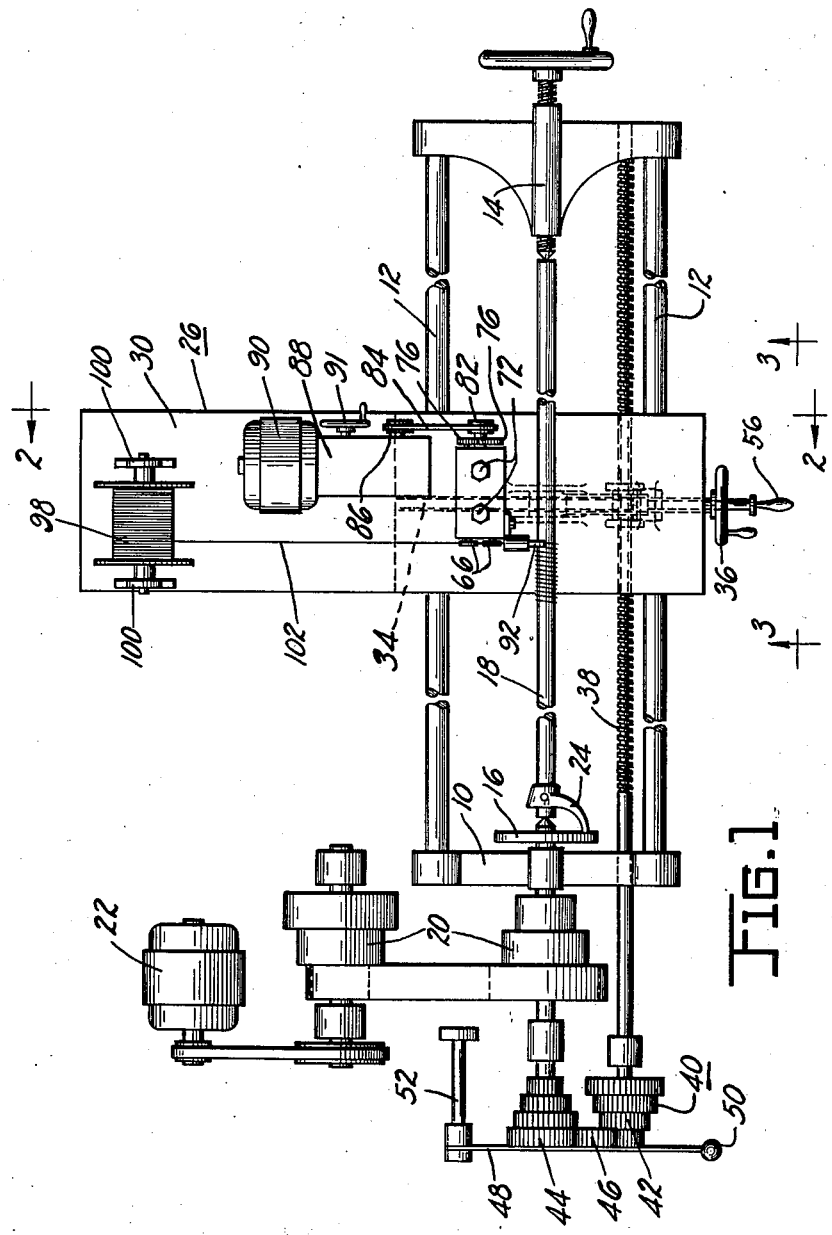
INVENTOR.
ROBERT C. PIERCE
BY Booth & MacDuff
ATTORNEYS.

July 21, 1942.  R. C. PIERCE  2,290,380
MACHINE FOR HOSE CONSTRUCTION
Filed Aug. 21, 1939   2 Sheets-Sheet 2

INVENTOR.
ROBERT C. PIERCE
BY Booth & MacDuff
ATTORNEYS.

Patented July 21, 1942

2,290,380

UNITED STATES PATENT OFFICE 2,290,380

MACHINE FOR HOSE CONSTRUCTION

Robert C. Pierce, Niles, Mich., assignor to National-Standard Company, Niles, Mich., a corporation of Michigan Application August 21, 1939, Serial No. 291,116

8 Claims. (Cl. 153—67)

This invention relates to a machine for winding wire upon a mandrel and more particularly to a machine adapted to the construction of reinforced hose.

It is characteristic of hoses reinforced with coiled wire to assume a spiral condition rather than to lie straight. As shown in my Patent No. 2,156,899 granted on May 2, 1939, to overcome this difficulty it is necessary to apply the wire reinforcement permanently set to substantially the same diameter of spiral curvature as it will assume in the completed hose.

Consequently it is an object of my invention to provide a machine by means of which wire can be wound upon a mandrel, or other element upon which a hose might be built, so that it is permanently set to the outside diameter of the mandrel and has no tendency to spring back or unwind therefrom.

The preferred mechanism which I have devised to accomplish this object includes a quill having a passage for wire curved to a radius somewhat less than the radius of the mandrel or hose body upon which the wire is to be wound, and means for forcing wires through this quill and on to the mandrel. Important elements of the machine are various adjustments, including adjustments of the speed of the wire feeding device and the mandrel whereby they may be exactly synchronized, and adjustments of the position of the quill relative to the mandrel.

The above and other objects and desirable particular constructions will become apparent upon reference to the following detailed description of one embodiment of my invention as shown in the accompanying drawings, in which:

Figure 1 is a top plan view of my novel machine;

Figure 3:
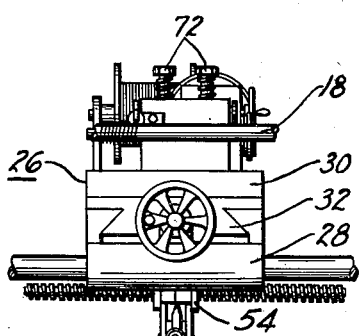
Figure 3 is a partial front elevational view showing the wire feeding carriage.
Figure 2:
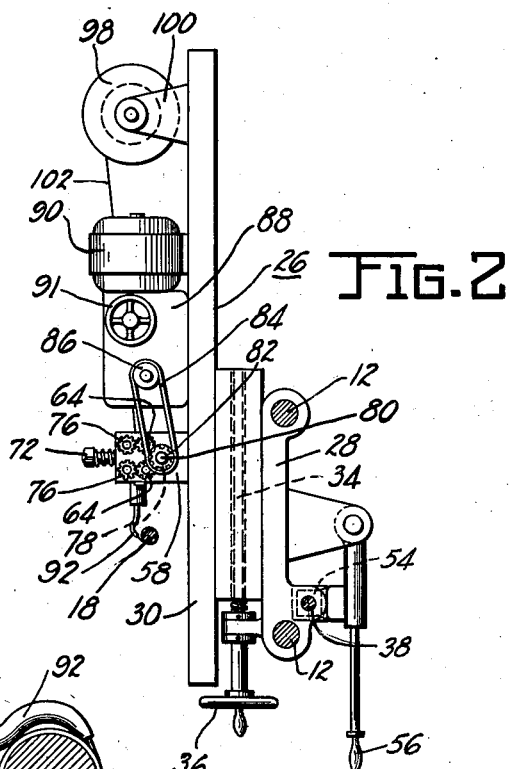
Figure 2 is a vertical sectional view of the machine taken on the line 2—2 of Figure 1.
Figure 4:
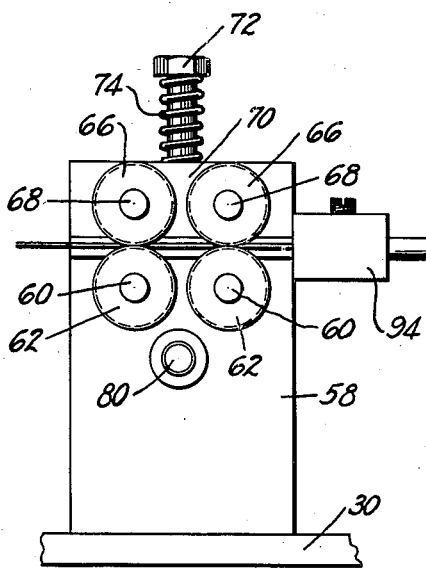
Figure 4 is a side elevational view on a larger scale of the wire feeding device and quill.
Figure 5:
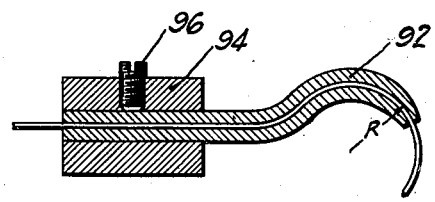
Figure 5 is a longitudinal sectional view through the quill.

Referring now to the drawings, my novel machine may comprise a frame 10 having guide-ways 12 extending longitudinally thereof and provided with an adjustable tail stock 14 at one end and with a rotatably driven head stock 16 at the other end, adapted to support and drive a mandrel 18 in substantial alignment with the guide-ways 12. The head stock may be driven at several speeds by means of cone pulleys 20, which in turn are driven by an electric motor 22. The mandrel 18 may be placed in driving engagement with the head stock 16 by means of a dog 24 or other suitable arrangement.

A carriage, indicated generally by the numeral 26, is slidably mounted upon the guide-ways 12 and may comprise two parts, the lower part 28 engaging the guide-ways 12, and the upper part 30 (forming a table) being transversely slidably mounted upon the lower part by means of a dove-tail gib 32. Suitable screw mechanism 34 operable by means of a hand wheel 36 may be provided for transversely adjusting the upper table member 30 relative to the lower member 28.

Mechanical means for moving the carriage longitudinally of the guide-ways may be provided in the form of a screw 38 rotatably mounted in the frame work 10 parallel to the guide-ways and drivable at various speeds by means of a gear set 40. The gear set 40 may comprise a set of gears 42 of progressively increasing diameter mounted upon the screw 38 and a second set of gears 44 of progressively decreasing diameter mounted upon the shaft of the tail stock 16. Power is transmitted between respective pairs of gears of the sets 42 and 44 by means of an idler gear 46 mounted upon a lever 48 manually slidable by means of a handle 50 upon a slide 52 so that the several pairs of gears may be engaged selectively. The roller member 28 of the carriage 26 carries a split nut 54 engageable at the will of the operator with the screw 38 by means of a handle 56, whereby the rotation of the screw causes the carriage 26 to be moved longitudinally at a predetermined rate depending upon the pair of gears selected in the gear set 40.

A vertical bracket 58 is mounted upon the table 30 adjacent the mandrel 18 and forms a journal for two shafts 60 which carry at one end wire feed rollers 62 and at the other end spur gears 64, a second set of rollers 66 are mounted on shafts 68 journalled in a block 70 secured on the upper end of the bracket 58 by a pair of machine screws 72. The rollers 62 and 66 form matching pairs for feeding wire and are forced into engagement by springs 74 compressed between the heads of the screws 72 and the block 70. The shafts 68 are provided with spur gears 76 which mesh with the corresponding gear 64 on the shafts 60. The whole roller assembly is driven by another spur gear 78 mounted upon a shaft 80 journalled in the bracket 58 and positioned so that the gear 78 meshes with both of the gears 64. The shaft 80 carries a pulley 82 which is driven by means of a V-belt 84 by a pulley 86 mounted upon the driven shaft of an infinitely variable transmission 88 which is driven by a motor 90. The speed of the pulley 86 may be varied by turning the hand wheel 91. The rollers 62 and 66 are preferably formed with peripheral grooves to hold the wire.

A quill 92 is mounted in a bracket 94 secured to the face of the bracket 58. The quill 92 is in the form of a tube having a passage for wire which is slightly larger than the wire which is to pass through it. It is removably mounted in the bracket 94 by means of a set screw 96 and the bracket is so positioned that the wire passage in the quill is in alignment with the contacting edges of the rollers 62 and 66. The discharge end of the quill is formed for somewhat less than half of its length in a curve having a radius R, somewhat smaller than the radius of the mandrel with which the particular quill is to be used.

Wire may be supplied to the machine from a reel 98 mounted upon brackets 100 on the table 30 or from any other suitable source.

The operation of my machine is as follows. A mandrel having a diameter equal to the inside diameter of the hose, which is to be built, is selected and placed in the stocks 14 and 16 of the machine. Then, by means which have no relation to this invention, the inner layers of rubber and fabric forming a portion of the hose body may be wound upon the mandrel. Then with the carriage 26 positioned at one end of the mandrel a wire 102 is brought from the reel 98, fed between the rollers 62 and 66 and then through the quill 92. The linear speed with which the wire 102 will be fed by the rollers 62 and 66 is synchronized with the peripheral speed of the mandrel 18 by turning the hand wheel 10. The motors 22 and 90 are then started. The rollers 62 and 66 force the wire through the quill 92 and, in passing through the curved portion of the quill, it is formed into a spiral of the radius R and passes from the quill on to the mandrel. Due to the fact that the radius R is less than the radius of the mandrel the resulting coiled wire on the mandrel will fit tightly thereon and will not tend to unwind or spring away therefrom when released.

If the wire fits too tightly on the mandrel the position of the quill relative to the mandrel may be changed by operating the hand wheel 36 in such a way that the wire is partially straightened between the quill and the mandrel. By this means any degree of tightness may be obtained and a hose conforming to the requirements of my patent referred to above may be constructed.

Gears of the gear set 40 are placed in mesh to rotate the screw 38 so that the table is fed along the mandrel 18 to give the desired spiral pitch to the wire being wound on the mandrel.

After suitable reinforcements have been wound on the mandrel by means of my novel machine, the outer layers of rubber and fabric may be wound over it, whereupon the hose may be cured and stripped from the mandrel ready for use.

While only one embodiment of my invention has been described in detail it is not my intention that its scope should be limited to that embodiment or otherwise than by the terms of the appended claims.

What I claim is:

1. A machine for the construction of hose reinforcing coils comprising a rotatable mandrel, means for feeding wire onto the mandrel at a predetermined velocity substantially equal to the peripheral velocity of the mandrel, means for prebending the wire to a predetermined radius prior to engagement of the wire with the mandrel and means for moving the feeding and prebending means axially of the mandrel to form a helical coil thereon.

2. A machine for the construction of hose reinforcing coils comprising a rotatable mandrel upon which the hose may be built, means for feeding wire onto the mandrel at a linear rate equal to the peripheral velocity of the surface thereof, means for moving the feeding means axially of the mandrel and means for prebending the wire to a radius slightly less than the radius of the mandrel just prior to the engagement of the wire with the mandrel.

3. A machine for the construction of hose reinforcing coils comprising a mandrel, a carriage, means for causing relative rotation between the mandrel and the carriage, means for causing longitudinal translatory movement of the carriage relative to the mandrel, a quill on the carriage having a wire passage formed therein and curved on a radius less than the radius of the mandrel, a source of wire, and means for forcing wire from said source through the quill at a linear rate equal to the peripheral velocity of the mandrel.

4. A machine for the construction of hose reinforcing coils comprising a mandrel, a carriage, means for causing relative rotation between the mandrel and the carriage, means for causing longitudinal translatory movement of the carriage relative to the mandrel, means on the carriage having a wire passage and adapted to curve a reinforcing wire passing therethrough on a radius less than the radius of the mandrel, a source of wire, and means for forcing wire from said source through said means at a linear rate equal to the peripheral velocity of the mandrel.

5. A machine for the construction of hose reinforcing coils comprising a mandrel, a carriage and means for causing relative rotation between the carriage and the mandrel, a quill adjacent the mandrel having a curved wire passage, and means for forcing wire through the quill and onto the mandrel and means for adjusting the position of the quill relative to the mandrel.

6. A machine for the construction of hose reinforcing coils comprising a mandrel, means for rotating the mandrel at various speeds, a carriage, means for moving the carriage axially of the mandrel at various speeds, a source of wire, means on the carriage for positively feeding wire to the mandrel, variable speed means for driving said feeding means, means for prebending the wire positioned intermediate the feeding means and the mandrel, and means for adjusting the position of the prebending means relative to the mandrel.

7. A machine for winding a wire on a mandrel comprising positive means for feeding a wire to the mandrel, and prebending means adjacent the mandrel constructed and arranged to bend the wire on a curve having a radius less than the radius of the mandrel and means for adjusting the position of the prebending means relative to the mandrel.

8. A machine for winding a wire on a mandrel comprising at least a pair of motor driven rollers, means for pressing the rollers together with the wire between them, and prebending means adjacent the mandrel constructed and arranged to bend the wire on a curve having a radius less than the radius of the mandrel, said last named means comprising a quill having a curved wire passage therethrough and means for adjusting the position of the quill relative to the mandrel.

ROBERT C. PIERCE.

Patent No. 2,290,380.  CERTIFICATE OF CORRECTION.  July 21, 1942.

ROBERT C. PIERCE.

It is hereby certified that error appears in the printed specification of the above numbered patent requiring correction as follows: Page 2, first column, line 28, for "hand wheel 10" read --hand wheel 91--; and line 65, claim 1, before "velocity" insert --linear--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.